Patented Feb. 24, 1948

2,436,774

UNITED STATES PATENT OFFICE 2,436,774

METHOD AND CATALYSTS FOR THE PRODUCTION OF ALKENYL CYANIDES

Howard S. Nutting and Arthur R. Sexton, Midland, Mich., assignors to The Dow Chemical Company, Midland, Mich., a corporation of Delaware No Drawing. Application September 24, 1943, Serial No. 503,664

15 Claims. (Cl. 260—464)

1

This invention concerns an improved method and certain new catalysts for the production of alkenyl cyanides from corresponding beta-hydroxy alkyl cyanides. It particularly concerns the production of vinyl cyanide from ethylene cyanohydrin.

It is well known that alkenyl cyanides may be prepared by the thermal dehydration of beta-hydroxy alkyl cyanides, and certain catalysts for such reaction are also known. For instance, in German Patent No. 496,372 it is disclosed that tin and tin compounds, as well as certain other substances, may be employed as catalysts for the reaction. Again, in a pending application of E. C. Britton et al., Serial No. 354,106, filed August 24, 1940, Patent No. 2,389,607, issued November 27, 1945, it is disclosed that metallic aluminum and aluminum compounds are active catalysts for the dehydration reaction.

Although both the tin-containing substances and the aluminum-containing substances mentioned above are active catalysts for the dehydration of a beta-hydroxy alkyl cyanide to form a corresponding alkenyl cyanide, each of these types of catalysts possesses certain disadvantages. We have found that tin salts are extremely active catalysts but that, when used in the reaction, tarry by-products are formed in considerable amount with consequent reduction in the yield of the desired alkenyl cyanide product. Aluminum salts, on the other hand, are more mild in action and may be used to produce an alkenyl cyanide in somewhat higher yield than when using a tin salt. However, the rate and extent of the dehydration reaction is undesirably low when an aluminum salt is employed as the catalyst.

We have now found that a mixture of tin and aluminum salts containing less than 50 per cent by weight of tin based on the combined weight of aluminum and tin in said salts is far more effective as a catalyst for the reaction than is either of said salts alone. By employing such mixture of aluminum and tin salts as a catalyst, the reaction may be carried out more rapidly and completely with less by-product formation than when employing as the catalyst a similar amount of either the aluminum salt or the tin salt alone under otherwise similar reaction conditions.

The activity of the aluminum and tin salts employed as ingredients of the mixed catalyst appears to be due principally to the metal ions thereof, and the acid radical of such metal salts is of secondary importance. A wide variety of aluminum and tin salts may be used in preparing the catalyst mixture. Examples of such salts

2 are: aluminum acetate, aluminum propionate, basic aluminum acetate, aluminum chloride, aluminum nitrate, aluminum sulphate, stannic chloride, stannous chloride, stannic sulphate, stannous sulphate, stannic acetate, stannous acetate, stannic phosphate, stannous oxalate, etc. It will be understood that in forming the mixed catalyst the metal salts need not be added as such, but may be formed in situ within the reaction mixture. For instance, when the dehydration reaction is to be carried out in the presence of an acid, such as acetic acid, propionic acid, or sulphuric acid, etc., the catalytic salts may be formed in situ by adding the corresponding metals or metal oxides to the reaction mixture.

Although any of a wide variety of aluminum and tin salts may be used as ingredients of a catalyst mixture, salts which are at least sparingly soluble in the reaction mixture are most conveniently employed and are preferred. Thus, as the metal salts we preferably employ aluminum and tin salts of volatile organic carboxylic acids such as formic acid, acetic acid, propionic acid, etc., since such salts are in most instances at least partially soluble in the beta-hydroxy alkyl cyanide reactant. As hereinbefore mentioned, the salts are admixed in relative proportions such that the mixture contains an appreciable proportion but less than 50 per cent, e. g., from 5 to 30 per cent, of tin based on the combined weight of the tin and aluminum in said salts. The mixed catalyst is usually employed in amount corresponding to from 0.2 to 2 per cent of the weight of the beta-hydroxy alkyl cyanide reactant, but it may be used in smaller or larger proportions if desired.

The catalyst may be admixed with the beta-hydroxy alkyl cyanide prior to or during the reaction. In practice the reaction is advantageously carried out in a continuous manner by charging the mixed catalyst into a reaction zone, bringing said zone to a reaction temperature, usually of from 150 to 250° C., and feeding the beta-hydroxy alkyl cyanide into the heated reaction zone where it is dehydrated upon contact with the catalyst to form a corresponding alkenyl cyanide which distills from said zone as it is formed. The rate at which the beta-hydroxy alkyl cyanide is fed into said zone is preferably such as to permit distillation of the alkenyl cyanide product and water from said zone at a steady and substantially uniform rate. Alternatively, the reaction may be carried out in batch manner by heating a mixture of the beta-hydroxy alkyl cyanide and the catalytic salts to a reaction temperature and distilling the alkenyl cyanide product and water from the mixture as formed. The reaction is usually carried out at atmospheric pressure or thereabout, but it may be carried out at other pressures, e. g., between 5 and 30 pounds per square inch, absolute, if desired.

The reaction is advantageously carried out in the presence of a volatile organic carboxylic acid such as acetic acid or propionic acid, since such acid stabilizes the moist alkenyl cyanide product against decomposition and thereby permits the production of said product in higher yield than would otherwise be possible. Usually from 5 to 10 per cent by weight of such volatile organic acid is admixed with the hydroxy-alkyl cyanide reactant prior to carrying out the reaction. Smaller or larger amounts of the organic acid may be used if desired.

By operating as just described, a beta-hydroxy alkyl cyanide may catalytically be dehydrated to produce a corresponding alkenyl cyanide rapidly, in good yield, and without excessive by-product formation. The method may be applied in dehydrating any beta-hydoxy alkyl cyanide to form a corresponding alkenyl cyanide. For instance, it may be applied in dehydrating ethylene cyanohydrin to produce vinyl cyanide, in dehydrating propylene cyanohydrin to produce propenyl cyanide, in dehydrating butylene cyanohydrin to produce a butenyl cyanide, etc.

The following example describes certain ways in which the principle of the invention has been applied and illustrates certain of its advantages, but is not to be constructed as limiting the invention:

Example

In each of a series of experiments, the metal compounds, or compounds, named as the catalyst in the following table, in the amounts also given, were admixed with the amounts of water stated and the mixture was placed in a distilling flask. In some instances, the amount of water used was sufficient to dissolve completely the salts and in others it formed a mixture or slurry of the salts. The mixture within the flask was heated to temperatures between 190° and 210° C. and a mixture of 650 grams of ethylene cyanohydrin and 50 grams of glacial acetic acid was added gradually while maintaining the mixture within the flask at temperatures within the range just stated. During the addition, vinyl cyanide and water distilled from the mixture as formed. The mixture of ethylene cyanohydrin and acetic acid were added at a rate such as to permit continuous distillation of the water and vinyl cyanide product at distilling temperatures below 100° C. without greatly increasing the volume of materials in the still at any time. The rate of addition was thereby varied in accordance with the rate at which vinyl cyanide was formed and distilled from the reaction mixture so that the time required to carry out the reaction is a measure of the relative activities of the different catalysts tested. In each experiment the mixture within the distilling flask was maintained at temperatures between 190° and 210° C. until all of the ethylene cyanohydrin had been added, at which time the temperature of the mixture was increased in about 15 minutes to approximately 250° C. so as to distill therefrom, as completely as possible, the vinyl cyanide product. The mixture of vinyl cyanide and water, collected as the distillate, settled into an upper organic layer which contained approximately 96.5 per cent by weight of vinyl cyanide and a lower aqueous layer containing 7.7 per cent of vinyl cyanide. The layers were separated, weighed, and the total yield of vinyl cyanide was determined. In each experiment tarry by-products were formed and remained in the residue together with the salt, or salts, employed as the catalyst. The yield of such residual by-products was also determined. The table names and gives the quantities of the ingredients of the aqueous catalysts employed in the different experiments, gives the time required to carry out each reaction, and gives the yield of vinyl cyanide as per cent of theoretical, based on the ethylene cyanohydrin used as a starting material. It also gives the amount of tarry by-products formed in each experiment as percent of the weight of the vinyl cyanide product.

Table

| Run No. | Catalyst Ingredients | Gms. | Reaction Period, Hrs. | Per cent Yield of Vinyl Cyanide | By-Products as Per cent of Vinyl Cyanide |
|---|---|---|---|---|---|
| 1 | Basic AlAc [1] / H₂O | 3 / 12 | 17 | 86 | 12.8 |
| 2 | Basic AlAc [2] / H₂O | 3 / 20 | 10 | 86 | 15.0 |
| 3 | Stannic Oxide / H₂O | 3 / 20 | 8 | 80 | 18.6 |
| 4 | Stannous Oxide / H₂O | 3 / 20 | 4.75 | 84 | 15.9 |
| 5 | Stannic Sulphate / H₂O | 3 / 20 | 4.7 | 76 | 24.2 |
| 6 | Basic AlAc [1] / Stannic Sulphate / H₂O | 3 / 0.3 / 20 | 4.2 | 88 | 10.5 |
| 7 | Basic AlAc [1] / Stannic Oxide / H₂O | 3 / 0.5 / 20 | 4.2 | 89 | 10.9 |
| 8 | Basic AlAc [1] / Tin Oxalate / H₂O | 3 / 0.5 / 20 | 5.0 | 88 | 9.8 |
| 9 | Basic AlAc [1] / Tin Oxalate | 1.0 / 0.1 | 5.0 | 88 | 8.3 |
| 10 | Basic AlAc [1] / Tin Oxalate / H₂O | 2 / 0.5 / 20 | 3.5 | 89 | 9.2 |
| 11 | Basic AlAc [1] / Stannic Phosphate / H₂O | 3 / 0.5 / 20 | 4.2 | 91 | 8.3 |

[1] Water-soluble basic aluminum acetate.
[2] Water-insoluble basic aluminum acetate.

In the foregoing table, where a basic metal compound, e. g., tin oxide or basic aluminum acetate, is referred to as a catalyst ingredient, it will be understood that such basic compound is acted on by the acetic acid to form the metal acetate so that the latter is present as a catalyst ingredient throughout the major part of the reaction. Runs 1 and 2 of the table illustrate the fact that an aluminum salt alone is effective as a catalyst, but that it is less active than desired and that its use results in considerable by-product formation. Runs 3-5 illustrate the fact that tin compounds are more active than aluminum compounds as catalysts for the reaction, but that the use of a tin compound alone as the catalyst results in greater by-product formation and a lower yield of vinyl cyanide than when using an aluminum compound as the catalyst. Runs 6-11 show that mixtures of tin and aluminum compounds are more active as catalysts than are the compounds of either metal alone and that by employing such mixed catalyst the reaction may be carried out more rapidly and with less by-product formation to produce an alkenyl cyanide in higher yield than when employing either individual ingredient of the mixed catalyst under otherwise similar reaction conditions.

Runs 6-11 in the foregoing example illustrate a preferred procedure for practicing the invention. However, other procedures may be used with good results. For instance, instead of initially charging into the reaction zone an aqueous solution or mixture of the catalytic metal salts, the latter may be introduced in dry or powdered form. The water which usually is introduced together with said salts appears to facilitate rapid and thoroughly mixing of the catalyst with the beta-hydroxy-alkyl cyanide reactant, but its presence is not required. Again, instead of first charging the reaction zone with the catalyst and thereafter introducing the beta-hydroxy-alkyl cyanide reactant, the catalyst may be co-dissolved or admixed with said reactant and be introduced together with the latter to the reaction zone.

Although the mixed catalyst provided by the invention consists essentially of a mixture of tin and aluminum compounds, it may have admixed therewith a minor amount, e. g., less than 10 per cent by weight, of other catalytic salts such as zinc acetate, ferric chloride, ferric sulphate, etc. The presence of such other catalytic salts in minor amount does not appear to be detrimental, but their use as a major ingredient of the catalyst mixture often impairs the quality of the latter. Non-catalytic salts such as sodium chloride, sodium sulphate, sodium carbonate, etc., have little or no effect on the dehydration reaction and may be present in the catalyst mixture.

Other modes of applying the principle of the invention may be employed instead of those explained, change being made as regards the method or catalyst herein disclosed provided the steps or ingredients stated by any of the following claims or the equivalent of such stated steps or ingredients be employed.

We therefore particularly point out and distinctly claim as our invention:

1. In a method for the dehydration of a beta-hydroxy-alkyl cyanide to form an alkenyl cyanide, the step of carrying the reaction out in the presence of a mixture of appreciably soluble salts of aluminum and tin as a catalyst while distilling the alkenyl cyanide from the reaction mixture as it is formed.

2. In a method wherein a beta-hydroxy-alkyl cyanide is thermally dehydrated to form an alkenyl cyanide which is distilled from the mixture during the reaction, the step of carrying the reaction out in the presence of a mixed catalyst consisting of appreciably soluble salts of tin and aluminum in relative proportions such as to contain at least 50 per cent by weight of aluminum based on the combined tin and aluminum content of said salts.

3. In a method wherein a beta-hydroxy-alkyl cyanide is thermally dehydrated to form an alkenyl cyanide and the latter is distilled from the mixture as formed, the step of carrying out the reaction in liquid phase and in the presence of a mixed catalyst consisting of appreciably soluble salts of tin and aluminum in relative proportions such as to contain between 5 and 50 per cent by weight of tin based on the combined tin and aluminum content of said salts, the aluminum salt being a salt of an organic carboxylic acid.

4. In a continuous method for the production of an alkenyl cyanide, the steps which consist in introducing a mixture of a beta-hydroxy-alkyl cyanide and a volatile organic carboxylic acid into contact with a mixed dehydration catalyst consisting of a tin salt and an aluminum salt of a volatile organic carboxylic acid in relative proportions such as to contain between 5 and 50 per cent by weight of tin based on the combined tin and aluminum content of said salts while heating the resultant mixture at a reaction temperature such that the beta-hydroxy-alkyl cyanide is dehydrated to form water and an alkenyl cyanide which are distilled from the reaction mixture together with a volatile organic carboxylic acid.

5. In a method for the dehydration of ethylene cyanohydrin to form vinyl cyanide, the step of carrying out the dehydration reaction in liquid phase and in the presence of a mixed catalyst consisting of appreciably soluble salts of aluminum and tin.

6. In a method for the production of vinyl cyanide, the steps of heating liquid ethylene cyanohydrin to a reaction temperature in the presence of a mixed catalyst consisting of appreciably soluble salts of tin and aluminum in relative proportions such as to contain between 5 and 50 per cent by weight of tin based on the combined tin and aluminum content of said salts, and distilling vinyl cyanide from the mixture as it is formed.

7. In a method for the production of vinyl cyanide, the steps of heating a liquid mixture of ethylene cyanohydrin and a volatile organic carboxylic acid together with a mixed dehydration catalyst, consisting of appreciably soluble salts of tin and aluminum in relative proportions such as to contain between 5 and 50 per cent by weight of tin based on the combined tin and aluminum content of said salts, to a reaction temperature at which the ethylene cyanohydrin is dehydrated to form water and vinyl cyanide which distill from the reaction mixture together with the volatile organic carboxylic acid.

8. In a continuous method for the production of vinyl cyanide, the steps which consist in introducing a liquid mixture of ethylene cyanohydrin and acetic acid into contact with a mixed dehydration catalyst consisting of a tin salt and an aluminum salt of an organic carboxylic acid in relative proportions such as to contain between 5 and 50 per cent by weight of tin based on the combined tin and aluminum content of said salts, while heating the resultant mixture to a reaction temperature such that the ethylene cyanohydrin is dehydrated to form water and acetic acid which distill, together with acetic acid, from the mixture during the reaction.

9. A catalyst for the dehydration of a beta-hydroxy-alkyl cyanide to form an alkenyl cyanide, which catalyst consists essentially of salts of tin and aluminum in relative proportions such as to contain between 5 and 50 per cent by weight of tin, based on the combined tin and aluminum content of said salts, at least one of said salts being a salt of an organic carboxylic acid.

10. A catalyst as described in claim 9, wherein the aluminum salt is a salt of an organic carboxylic acid.

11. A catalyst as described in claim 9, wherein the aluminum salt is an aluminum salt of acetic acid.

12. A catalyst as described in claim 9, wherein the aluminum salt is basic aluminum acetate.

13. A catalyst as described in claim 9 wherein the tin and aluminum salts are salts of organic carboxylic acids.

14. A catalyst as described in claim 9 wherein the tin and aluminum are present as salts of a volatile organic carboxylic acid.

15. A catalyst as described in claim 9 wherein the tin and aluminum are present as salts of acetic acid.

HOWARD S. NUTTING.
ARTHUR R. SEXTON.

REFERENCES CITED

The following references are of record in the file of this patent:

UNITED STATES PATENTS

| Number | Name | Date |
| --- | --- | --- |
| 1,752,016 | Maximoff | Mar. 25, 1930 |
| 1,784,583 | Dreyfus | Dec. 9, 1930 |
| 2,008,490 | Dietrick et al. | July 6, 1935 |
| 2,037,389 | Nicodemus et al. | Apr. 14, 1936 |
| 2,374,051 | Spence | Apr. 17, 1945 |
| 2,375,005 | Kung | May 1, 1945 |
| 2,393,569 | Ross et al. | Jan. 22, 1946 |

FOREIGN PATENTS

| Number | Country | Date |
| --- | --- | --- |
| 496,372 | Germany | Apr. 24, 1930 |
| 512,154 | Great Britain | Aug. 30, 1939 |

OTHER REFERENCES

Shujkin et al., Jour. Physical Chemistry, vol. 39, page 1197 (1935). (Cited in Berkman et. al., "Catalysis," page 738.)